Aug. 23, 1966     R. CZEKALLA ET AL     3,267,808
FILTER ASSEMBLY FOR PHOTOGRAPHIC APPARATUS
HAVING TWO SETS OF PIVOTED FILTERS
Filed Jan. 28, 1963     3 Sheets-Sheet 1
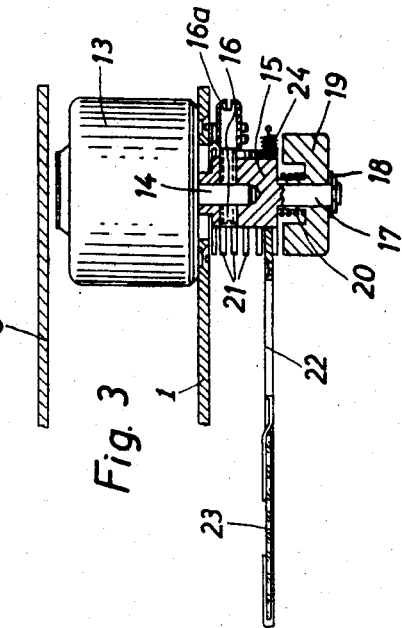
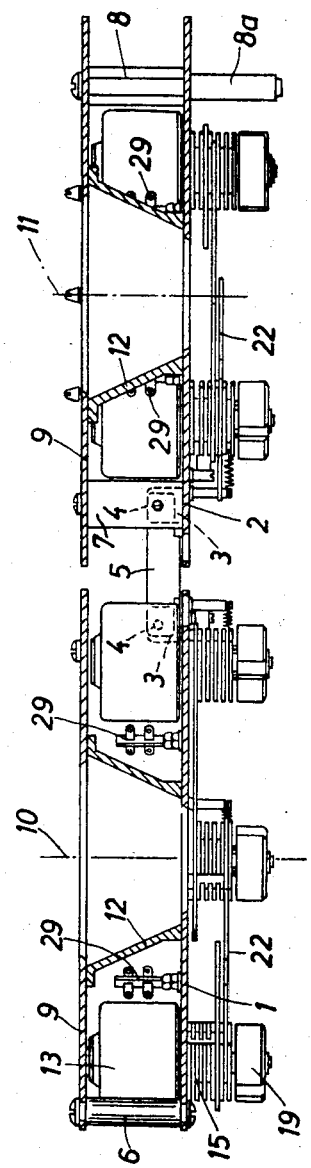
INVENTOR.
ROLAND CZEKALLA
BY   WILHELM BAASNER
HANS-ADO BRANDT
Michael S. Striker
ATTORNEY

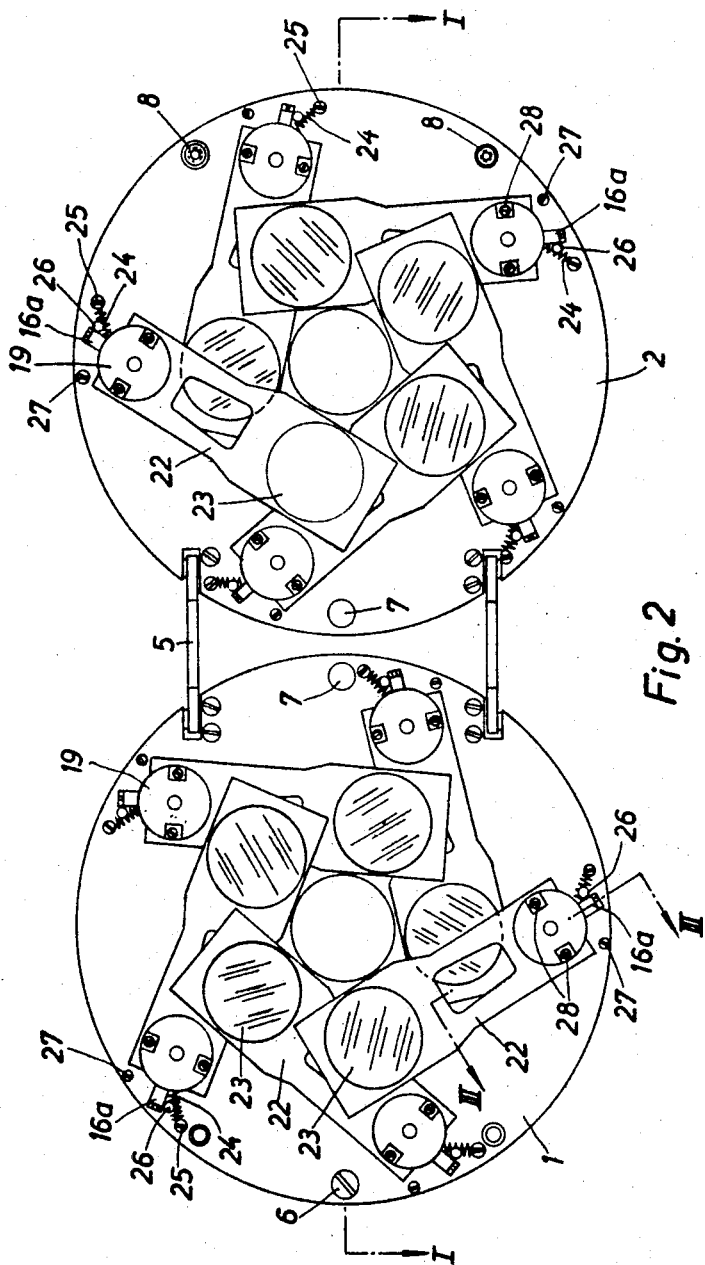

INVENTOR.
ROLAND CZEKALLA
WILHELM BAASNER
HANS-ADO BRANDT

United States Patent Office 3,267,808
Patented August 23, 1966

3,267,808
FILTER ASSEMBLY FOR PHOTOGRAPHIC APPARATUS HAVING TWO SETS OF PIVOTED FILTERS
Roland Czekalla, Wilhelm Baasner, and Hans-Ado Brandt, Munich, Germany, assignors to Agfa Aktiengesellschaft, Leverkusen, Germany
Filed Jan. 28, 1963, Ser. No. 254,163
Claims priority, application Germany, Jan. 27, 1962,
A 39,312
8 Claims. (Cl. 88—113)

The present invention relates to photographic apparatus and more particularly to filter assemblies to be used with photographic apparatus.

In certain types of photographic apparatus such as enlargers used to make photographic prints it is often required to use with the enlarger a device which enables the operator to locate selected filters of different colors in the path of light. Such filter assemblies at the present time require an undesirable amount of space and often cannot be attached without special adapters or the like to conventional enlargers. The size of many known devices of this type is not only undesirably large in a circumferential direction with respect to the optical axis but also in a direction parallel to the optical axis. Moreover, these devices conventionally include complex linkages enabling the filters to be selectively positioned across the optical axis and with the known structures there is a lack of balance and also there are undesirable vibrations in the parts when they are moved between their inoperative and operative positions.

It is accordingly a primary object of the present invention to provide a filter assembly of the above type which is relatively small and compact as compared to known apparatus of this type.

It is further an object of the present invention to provide a filter assembly which while being relatively small and compact is capable of carrying a large number of filters which can be selectively positioned either separately or in any desired combination in operative positions extending across the optical axis.

Another object of the present invention is to provide a structure of this type which enables the filters to be moved to their operative positions without any undesirable vibrations or rebounding.

The objects of the present invention also include a filter assembly which can readily be opened to a position giving easy access to all of the components thereof.

An additional object of the present invention is to provide a filter asesmbly in which the parts are protected.

With the above objects in view, the invention includes, in a filter assembly for photographic apparatus, a support plate formed inwardly of its outer periphery with an opening whose center is aligned with the optical axis during use of the filter assembly. A plurality of filter levers are distributed about and located adjacent this opening, and these levers respectively carry different filters. Also, a plurality of turning means are carried by the support plate adjacent its outer periphery, and the plurality of turning means are respectively connected operatively to the plurality of levers for respectively turning them between an inoperative position where they are out of line with the opening of the support plate and an operative position where they extend across this opening with the filters aligned therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional elevation taken along line I—I of FIG. 2 in the direction of the arrows and showing the filter assembly of the invention in its open position where access may be had to the various components of the assembly;

FIG. 2 is a plan view of the structure of FIG. 1 as seen from the underside of FIG. 1;

FIG. 3 is a fragmentary sectional elevation, on an enlarged scale as compared to FIGS. 1 and 2, taken along line III—III of FIG. 2 in the direction of the arrows and showing one of the filter levers and the structure connected thereto for moving it between its inoperative and operative positions;

Figure 4:
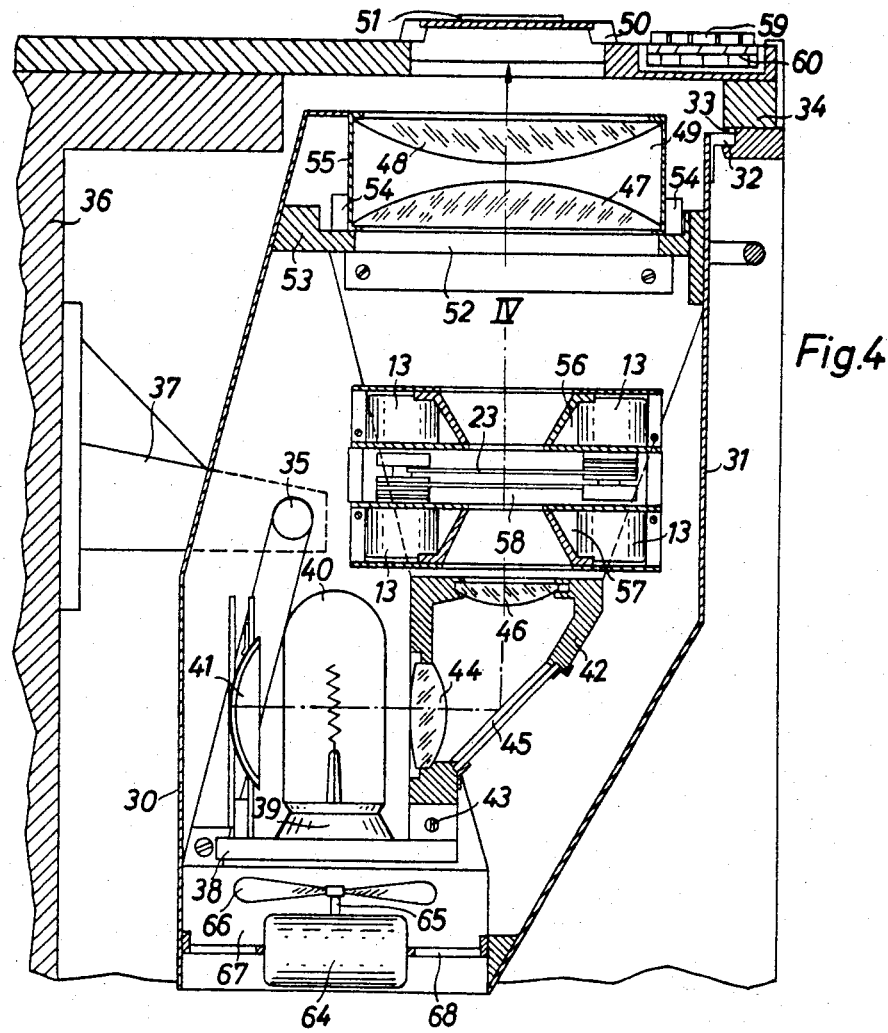
FIG. 4 is a fragmentary sectional elevation of an enlarger provided with the structure of the invention.

Referring now to FIGS. 1 and 2, the filter assembly of the invention includes a pair of identical support plates 1 and 2 which are of circular configuration. Each of the support plates 1 and 2 is formed inwardly of its outer periphery with a central circular opening whose center is adapted to be aligned with the optical axis during use of the filter assembly. At their edge portions which are adjacent each other, in the position of the plates 1 and 2 shown in FIGS. 1 and 2, each plate carries a pair of upstanding ears 3, and these ears fixedly carry pivot pins 4 to which a pair of links 5 are connected in the manner shown in FIGS. 1 and 2. Moreover, as is clearly apparent from FIG. 2, the plates 1 and 2 are formed beside the ears 3 with notches in which the links 5 can freely turn. With this arrangement it is possible to turn the plate 1 of FIG. 1 downwardly in the direction of the arrow shown at the lower left of FIG. 1 through 180° to a position where it is aligned with and located beneath the plate 2, and in this latter position the plates 1 and 2 are mutually spaced and parallel to each other, and it is in this position that the filter assembly is used. At their edge portions which are adjacent each other, in the position of the plates 1 and 2 shown in FIGS. 1 and 2, the plates 1 and 2 fixedly carry spacer members 7 which extend perpendicularly to the plates 1 and 2 upwardly from these plates, as viewed in FIG. 1, and at their edge portions which are distant from each other, the plates 1 and 2 respectively carry additional spacer members 6 and 8. These spacer members are fixed by suitable screws to the plates. The spacer members 6–8 serve to connect to the plates 1 and 2 a pair of annular cover plates 9 which are respectively coaxially aligned with the plates 1 and 2 and which have the same outer diameter.

The central opening of the plate 1 has its center located in the axis 10 indicated in FIG. 1, and the central opening of the plate 2 has its center located in the axis 11 shown in FIG. 1. When the plate 1 is in its position beneath the aligned with the plate 2 with this plate 1 inverted with respect to its position shown in FIG. 1, the axis 10 coincides with the axis 11 and also with the optical axis during use of the filter assembly of the invention. Each of the plates 1 and 2 fixedly carries a light-guiding tube 12, and the axes of these tubes 12 respectively coincide with the axes 10 and 11. The tubes 12 are located at their lower ends, as viewed in FIG. 1, adjacent to the central openings of the plates 1 and 2 and at their upper ends adjacent to the central openings of the cover members 9, and as is apparent from FIGS. 1 and 2 each tube 12 is of frustoconical configuration and has its smaller end located at the support plate. At the lower sides of the plates 1 and 2, as viewed in FIG. 1, are located a plurality of filter levers 22 described below, and these filter levers are turned between inoperative and operative positions by a plurality of turning means, respectively, which are carried by the plates 1 and 2. Each turning means includes a rotary electromagnet 13, and these magnets are distributed about the axes 10 and 11 adjacent to the outer peripheries of the plates 1 and 2 between the latter and the cover members 9.

Referring to FIG. 3 which shows in detail the structure of each turning means, the housing of the electromagnet 13 is fixed by suitable screws, for example, to the carrier plate, which happens to be the plate 1 in FIG. 3, and each electromagnet 13 includes a rotary shaft 14 which turns when the electromagnet is energized. Each shaft 14 extends freely through an opening formed in the carrier plate which carries the electromagnet 13. A lever support 15 is fixed to the shaft 14 for rotary movement therewith, and FIG. 3 indicates a set screw 16 used for fixing the lever support 15 to the shaft 14. Moreover, each lever support 15 threadedly carries an elongated screw member 16a which extends radially from the support 15 and which cooperates in a manner described below with a pair of stop members for limiting the range of turning of each filter lever 22, so that the projection 16a and the stop members form a limiting means limiting the extent of turning of the filter lever. Each lever support 15 has an integral axial extension 17 which is coaxial with the shaft 14, and a rotary mass 19 which is symmetrically constructed with respect to the axis of the shaft 14 is carried by and is freely turnable on the extension 17, a washer 18 being held by a snap ring or the like on the shaft 17 next to the rotary mass 19 to retain the latter on the extension 17. The rotary mass 19 is connected to the turning means by way of a slip-clutch means, and the preferred slip-clutch construction includes a coil spring 20 coiled around a portion of the rotary mass 19 and fixed at one end to the lever support 15 so that when the latter turns in one direction the coils of the spring 20 will automatically close upon and grip the mass 19 to turn the latter with the lever support 15. Each lever support 15 is formed with a plurality of radial notches 21 respectively located in planes parallel to the support plate, the shaft 14 being perpendicular to the support plate, and the number of notches 21 is equal to the number of filter levers and the number of turning means which are carried by each plate. As may be seen from FIG. 1, the several lever supports 15 are located at the same elevation with respect to the plate 1 or the plate 2, and thus the notches of the supports 15, all of which are identically constructed, are all located in distinct parallel planes which are parallel to the plate 1 or the plate 2. Each of the supports 15 is fixedly connected with only one filter lever 22 which is located in one of the notches 21, but the several levers 22 are respectively located in the different planes in which the notches are located so that in this way no two levers 22 are located in the same plane, and the turning means turns the lever 22 only in its own plane so that in this way even though the filter levers 22 overlap in the manner shown in FIG. 2 they cannot interfere with each other during their turning movement. The several filter levers 22 are extremely thin and flat and are freely turnable without any possibility of engaging each other. The several filter levers 22 respectively carry in openings thereof the several filter discs 23. A spring 24 is connected at one end to each lever support 15 and at its opposite end to a screw 25 fixed to the plate 1 or the plate 2, so that these springs 24 urge the lever supports 15 and the filter levers connected thereto to turn in a given direction. As is apparent from FIG. 2, each of the plates 1 and 2 fixedly carries on opposite sides of each stop projection 16a a pair of stop screws 26 and 27, and the springs 24 respectively urge the projections 16a into engagement with the stop members 26. In the inoperative positions of the filter levers 22 the projections 16a thus engage the stop members 26, and in their inoperative positions the levers 22 are distributed about and located adjacent the central opening of the plate 1 or the plate 2. It will be noted that the plurality of turning means are distributed along and located adjacent the outer peripheries of the plates 1 and 2 and operatively connected to the filter levers 22, respectively. Each lever support 15 threadedly carries a pair of screws 28 capable of being turned into engagement with the lever 22 at the portion thereof which is in a notch of the lever support 15, so that in this way the levers 22 are fixed to the lever supports 15, and it will be noted that the rotary masses 19 are each formed with a pair of diametrically opposed axial notches giving free access to the heads of the screws 28. The plates 1 and 2 carry a plurality of electrical connector assemblies 29 to which are connected the electrical leads for supplying electrical energy to the several rotary electromagnets 13, and the connections of these electrical leads to the stationary electrical contacts carried by the enlarger are not shown for the sake of clarity. In order to connect the several electromagnets 13 with a source of electrical energy, the filter assembly can be provided with one part of a plug-and-socket connection the other part of which is carried by the enlarger so that when the filter assembly is mounted on the enlarger the plug-and-socket connection is automatically closed to establish the electrical connections to the electromagnets. Thus, for example, any suitable part of the filter assembly may be provided with plugs, which are received in sockets carried by the enlarger when the filter assembly is mounted thereon, so that in this way the mounting of the assembly on the enlarger will automatically establish the required electrical connections.

As is apparent from FIG. 2, the several turning means carried by each plate 1 and 2 are uniformly distributed along a circle of a given diameter whose center coincides with the optical axis, and the circles along which the plurality of turning means are distributed are of the same diameter. However the plurality of turning means carried by one of the plates 1 and 2 are angularly offset with respect to the plurality of turning means carried by the other plate. With this arrangement when the plate 1 is turned in the manner described above to its operative position spaced beneath and parallel to the plate 2, as viewed in FIG. 1, the several lever supports 15 carried by the plate 1 will enter into respectively the spaces between the several lever supports 15 carried by the plate 2, and in the closed position of the filter assembly of the invention extensions 8a of the spacer pins 8 carried by the plate 2 engage at their lower free ends, as viewed in FIG. 1, the plate 1 to limit the movement of the latter toward the plate 2, the positioning pins 8a having reduced free end portions received in mating openings of the plate 1 for accurately positioning the latter with respect to the plate 2. When the plate 1 is in its operative position parallel to and beneath the plate 2, the elevation of the several notches of the lever supports 15 carried by the plate 1 is situated just beneath the notches of the lever supports carried by the plate 2, so that the levers 22 carried by the plate 1 are located in planes separate from those in which the levers 22 carried by the plate 2 are located, and the lowermost lever 22 carried by the plate 1 in FIG. 1 becomes situated just beneath and slightly spaced from the plane in which the lowermost lever 22 carried by the plate 2 is located, as viewed in FIG. 1. Moreover, the extent of offset of the plurality of turning means of the plate 1 with respect to those of the plate 2 is such that the turning axes of the several levers 22 carried by the plate 1 are located at equal angular distances from the turning axes of the levers 22 carried by the plate 2, and of course the turning axes of the levers 22 of the plate 1 will alternate with the turning axes of the levers 22 of the plate 2. The pair of covers 9, when the filter assembly is in its closed operative position, are slidable between a pair of stationary plates of the enlarger so that these plates serve to hold the filter assembly in its operative condition.

In the position of the parts shown in the drawing, all of the levers are in their inoperative positions. Before an exposure is made the operator will in a known way select which color filter or filters are to be placed in operative positions extending across the optical axis, and thus the operator will through a suitable selector mechanism known in the art close the circuit of the selected electromagnet 13. In the case of the plate 1, an electromagnet 13 which is carried thereby will when energized cause clockwise turning of the filter lever 22, as viewed in FIG. 2, but in any event whichever electromagnet is energized, the lever connected thereto will be turned by energized electromagnet in opposition to the spring 24 until the projection 16a engages the limiting stop 27, and in this way the selected filter lever will be precisely positioned in its operative position where the filter carried thereby is aligned with the optical axis which of course coincides with coinciding axes 10 and 11, as pointed out above. During the turning of the armature of the energized electromagnet 13, the shaft 14 and the lever support 15 also turn, and the slip-clutch spring 20 will grip the mass 19 so that the rotary mass 19 also turns. Because of its mass, the rotary mass 19 will, when the projection 16a engages the stop pin 27, continue to turn and will momentarily act through the spring 20 on the lever support 15 to continue to urge the latter in the direction which maintains the stop projection 16a against the stop member 27, and in this way vibration or rebounding of the turned filter lever 22 is reliably avoided. Thus, the construction will stabilize the filter levers and reliably prevent vibrations thereof particularly in directions transverse to the planes in which they turn. The selected electromagnet 13 is maintained energized during exposure so as to maintain the selected filter in its operative position, and thereafter when one filter is to be removed from the optical axis and replaced by another, the electromagnet 13 is deenergized so that the spring 24 can return the parts to their inoperative position.

Referring to FIG. 4, it will be seen that the lamp housing 30 of a photographic enlarger has fixedly connected thereto, as by welding, an angle member 32, situated at the front of the wall 31 of the enlarger housing 30, and this angle member 32 is received in a groove 33 of a member 34. In addition, the housing 30 is connected at 35 to an arm 37 which is fixedly carried by the supporting frame 36 in the form of a suitable table, for example. The housing 30 carries a horizontal intermediate wall 38 carrying a lamp socket 39 which receives the lamp 40, and the light from the lamp 40 is, in part, directed by the hollow reflector 41 to the assembly 42 which is fixed by one or more screws 43 to the intermediate wall 38. The light from the lamp 40 passes through the first auxiliary condenser lens 44 of the assembly 42, is then reflected through 90° by the mirror 45, and then passes through the second auxiliary condenser lens 46 of the assembly 42. The light then reaches and passes through the main condenser assembly 49 provided with the lenses 47 and 48, and after passing through the main condenser assembly 49 the light passes through the negative, transparency, diapositive, or the like, 51, which is supported on a suitable frame 50 of the member 34. The housing 55 of the main condenser assembly 49 rests on a stationary wall 53 carried by the housing 30, this wall 53 being formed with a circular opening 52 through which the light reaches the condenser assembly 49, and the wall 53 carries a plurality of blocks 54 which engage the housing 55.

Directly over the assembly 42 there are unillustrated guide plates carried by the housing 30 and slidably supporting the filter assembly 58 of the present invention, this filter assembly being composed of the upper unit 56 and the lower unit 57, and the filter assembly is capable of being slipped into the housing 30 on these unillustrated guide plates to the position illustrated in FIG. 4 where the optical axis IV coincides with the axis of the circular assembly 58.

As has been pointed out above, the insertion of the filter assembly of the invention into the enlarger establishes, through a series of unillustrated plug and socket connections, electrical contact with the several rotary electromagnets 13, and the member 34 carries a key board 60 made up of the several color-correcting keys 59 which are respectively connected electrically with the electromagnets so by selective actuation of the keys 59 it is possible for the operator to turn one or more of the filters 23 to an operative position extending across the optical axis.

Figure 5:
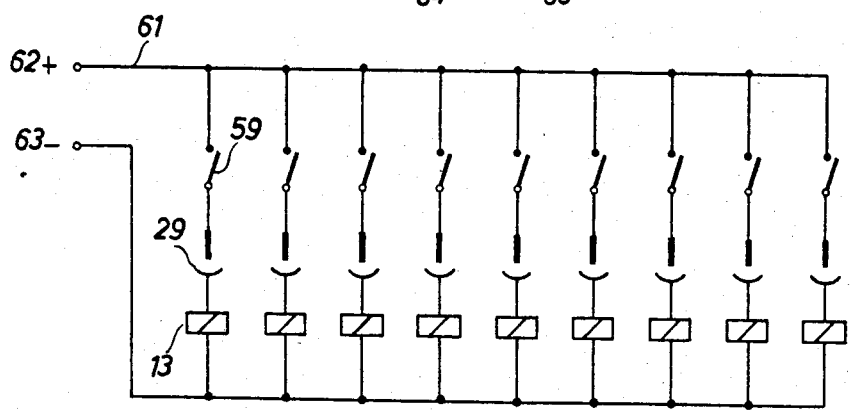
FIG. 5 is a wiring diagram illustrating how the structure of the invention is electrically controlled.

FIG. 5 shows the wiring diagram for the electric connections between the keys 59 and the electromagnets 13, FIG. 5 also showing the several plug and socket connections 29. As is apparent from FIG. 5 each of the keys 59 form part of a switch assembly and the several switch assemblies are respectively connected in series with the several electromagnets 13, while the several series-connected switches and electromagnets are connected in parallel in the circuit 61 which is connected to the output terminals 62 and 63 of a low voltage power supply unit.

Cooling of the entire housing 30 is provided by a fan assembly which includes a motor 64 whose shaft 65 carries a fan 66 which is horizontally positioned to rotate about a vertical axis and which is situated in the lower portion 67 of the housing beneath the wall 38. A support member 68 fixedly carries the motor 64 and is fixedly carried by the housing 30.

It will be understood that each of the elements described above, or two or more together, may also find a useful application in other types of photographic apparatus differing from the types described above.

While the invention has been illustrated and described as embodied in filter assemblies for photographic apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or special aspects of this invention and, therefore, such adaptations should and are intended to be comprehended within the meaning and range of equivalence of the following claims.

What is claimed as new and desired to be secured by Letters Patent is:

1. A filter assembly for photographic apparatus comprising, in combination, a pair of substantially parallely arranged spaced support plates having inner faces facing each other, said support plates being provided with substantially centrally arranged aligned openings having a common axis; two sets of filter means, each of said sets of filter means composed of a plurality of filter means mounted on said inner face of one of said support plates with said filter means spaced from each other in circumferential direction and in direction of said common axis of said openings, each of said filter means being pivoted on the respective support plate turnably in its plane about an axis parallel to said common axis between an operative position in alignment with said openings and an inoperative position out of alignment with said openings; and two sets of actuating means, each set carried by one of said support plates on said inner face thereof, each of said actuating means being coupled with one of said filter means for moving the same between said inoperative and operative positions thereof, the actuating means of each set of actuating means arranged circumferentially spaced from each other and projecting into the space between said support plates to such an extent that at least part of said acuating means of said two sets of actuating means are located in a common plane parallel to said support plates, said two sets of actuating means being offset in circumferential direction relative to each other so that the actuating means of one set of actuating means are located between the actuating means of the other set of actuating means.

2. In a filter assembly according to claim 1, further comprising connecting means connecting said plates to each other for movement between their mutually spaced position where the centers of said openings are aligned and a position where said plates are beside each other in a common plane.

3. A filter assembly according to claim 1, wherein the actuating means which are carried by one of said plates are uniformly distributed along a circle whose center coincides with the center of said opening of said one plate and the actuating means carried by the other plate are uniformly distributed along a circle of the same diameter and whose center is also aligned with the center of the opening of said other plate.

4. A filter assembly according to claim 3, wherein the actuating means carried by said one plate are offset with respect to the actuating means carried by said other plate by an angular distance which situates the turning axes of the filter means distributed about one of said openings respectively at equal angular distances from the turning axes of the filter means distributed about the other of said openings.

5. A filter assembly according to claim 1, wherein said actuating means include a plurality of rotary electromagnets respectively carried by said plates adjacent their outer periphery and respectively having rotary shafts which turn when said electromagnets are energized, said filter means including a plurality of lever supports respectively fixed to said shafts for rotary movement therewith and a plurality of filter levers being respectively fixed to and carried by said lever supports, said electromagnets when energized acting through said shafts and lever supports on said levers for respectively turning the same between inoperative and operative positions, said levers respectively carrying filters which are respectively aligned with said openings when said levers are in operative position.

6. A filter assembly according to claim 5, wherein said lever supports are formed with a plurality of notches respectively located in planes parallel to said plates and equal in number to the number of lever supports, all of said lever supports being located at the same elevation with respect to the respective plate and said levers being flat and respectively located in the planes in which said notches are located with each lever support receiving a part of a lever in a notch thereof so that said levers are respectively located at different distances from the respective plate in said planes of said notches for respective turning movement in said latter planes without interference.

7. A filter assembly according to claim 1, further comprising a plurality of rotary masses coaxial with said plurality of actuating means, respectively, a plurality of limiting means carried by said plates and limiting the turning of said filter means from their inoperative to their operative positions, respectively, for precisely locating said filter means in their operative positions, and a plurality of slip-clutch means respectively connecting said masses to said plurality of actuating means for transmitting turning of said plurality of actuating means to said masses, whereby when the plurality of limiting means limit the turning of said filter means upon arrival of the latter at their operative positions said masses continue to turn with respect to said actuating means wih slippage occurring at said plurality of slip-clutch means so that the levers are stopped at their operative positions without vibrations or rebounds.

8. A filter assembly according to claim 1, wherein each of said actuating means includes an electromagnetic turning means carried by the respective plate each of said filter means including a filter lever carrying a filter and each of said levers being operatively connected to the respective one of said electromagnetic turning means for turning between inoperative and operative positions extending across said openings to respectively align the filters therewith.

References Cited by the Examiner

UNITED STATES PATENTS

| | | | |
|---|---|---|---|
| 1,723,701 | 8/1929 | McNabb | 240—3.1 |
| 2,082,074 | 6/1937 | Moonmaw | 95—58 |
| 2,243,047 | 5/1941 | Foster et al. | 88—113 |
| 2,493,195 | 1/1950 | Henne | 95—60 |
| 2,822,729 | 2/1958 | Capatosto | 88—111 |
| 2,856,831 | 10/1958 | Gipe et al. | 95—62 |

OTHER REFERENCES

Schmidt, Paul, German patent application No. 1,077,526, March 10, 1960, Class 57a, 10/04.

DAVID H. RUBIN, *Primary Examiner.*

J. G. BOLTEN, *Assistant Examiner.*